(12) United States Patent
Caporaso (10) Patent No.: US 9,500,773 B2
(45) Date of Patent: Nov. 22, 2016

(54) HIGH VOLTAGE PHOTOCONDUCTIVE SWITCH PACKAGE

(71) Applicant: George J. Caporaso, Livermore, CA (US)

(72) Inventor: George J. Caporaso, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 13/913,319

(22) Filed: Jun. 7, 2013

(65) Prior Publication Data

US 2014/0363123 A1 Dec. 11, 2014

(51) Int. Cl.
G02B 1/00 (2006.01)

(52) U.S. Cl.
CPC .................. G02B 1/005 (2013.01)

(58) Field of Classification Search
CPC ............. G02B 6/1225; G02B 6/3596; H01L 31/0224; H01L 31/022408; H01L 31/022416; H01L 31/09; H01L 31/16
USPC .................. 385/1, 2, 16; 257/431, 432, 459
See application file for complete search history.

(56) References Cited

U.S. PATENT DOCUMENTS

2005/0287747 A1* 12/2005 Chakravarti .......... C23C 16/308
  438/288
2007/0092812 A1* 4/2007 Caporaso ................ H01L 31/09
  430/57.7

OTHER PUBLICATIONS

Nunnally et al; "Methods and configurations for improving photoconductive switch performance"; Power Modulator Symposium, 2002 and 2002 High-Voltage Workshop Conference Record of the Twenty-Fifth International; pp. 183-186; Jun. 30-Jul. 3, 2002.*
Tranter, "On Some Dual Integral Equations", Quart. J. Math, Oxford, (2), pp. 60-66 (1951).
Wiley, et al., "Analysis and Control of the Current Distribution Under Circular Dispersive Electrodes", IEEE Transactions on Biomedical Engineering, vol. BME-29, No. 5, pp. 381-385 (May 1982).
Song, et al., "Optimal Geometry Toward Uniform Current Density Electrodes", Inverse Problems, 27, 17 pages, (2011).
Dang, et al., "Fundamentals, Processes and Applications of High-Permittivity Polymer-Matrix Composites", Progress in Materials Science, 57, pp. 660-723 (2012).

* cited by examiner

Primary Examiner — Ryan Lepisto
(74) Attorney, Agent, or Firm — James S. Tak (57) ABSTRACT

A photoconductive switch having a wide bandgap material substrate between opposing electrodes, and a doped dielectric filler that is in contact with both the electrodes and the substrate at the triple point. The dielectric filler material is doped with a conductive material to make it partially or completely conducting, to minimize the field enhancement near the triple point both when the substrate is not conducting in the "off" state and when the substrate is rendered conducting by radiation in the "on" state.

2 Claims, 12 Drawing Sheets

HIGH VOLTAGE PHOTOCONDUCTIVE SWITCH PACKAGE

FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

CLAIM OF PRIORITY IN PROVISIONAL APPLICATION

This patent document claims the benefit and priority of U.S. Provisional Application No. 61/656,965, filed on Jun. 7, 2012, hereby incorporated by reference.

TECHNICAL FIELD

This patent document relates to photoconductive switches, and in particular to an improved photoconductive switch having a dielectric filler doped with a conducting dopant to make the filler partially or completely conducting, to minimize the field enhancement in both the off and on states.

BACKGROUND

Photoconductive switches and switch packages typically consist of a wide bandgap photoconductive material (e.g. GaN, ZnO, diamond, AlN, SiC, GaAs, BN, etc.), a source for energetic photons (e.g. a laser), a method to couple the laser into the switch, and a method for high voltage to enter and leave the switch package such as via electrodes positioned on opposite sides of the substrate. Arranged as such, the photoconductive switch package may be characterized as a three terminal device similar to transistors; with one of the terminals being a laser input or the voltage input to the laser system. When the photoconductive switch material is illuminated such as by a laser, the laser photons change the conductivity of the photoconductive material and make it viable as an optically controlled switch, capable of operating in the linear mode.

Photoconductive switches arranged vertically (i.e. electrodes on opposite side of a photoconductive substrate) that are subjected to high voltage can fail due to enhanced electric fields appearing at the triple point (where the conductor, substrate, and non-conductor are in contact) when the substrate is rendered conducting by the application of incident radiation.

Figure 1:
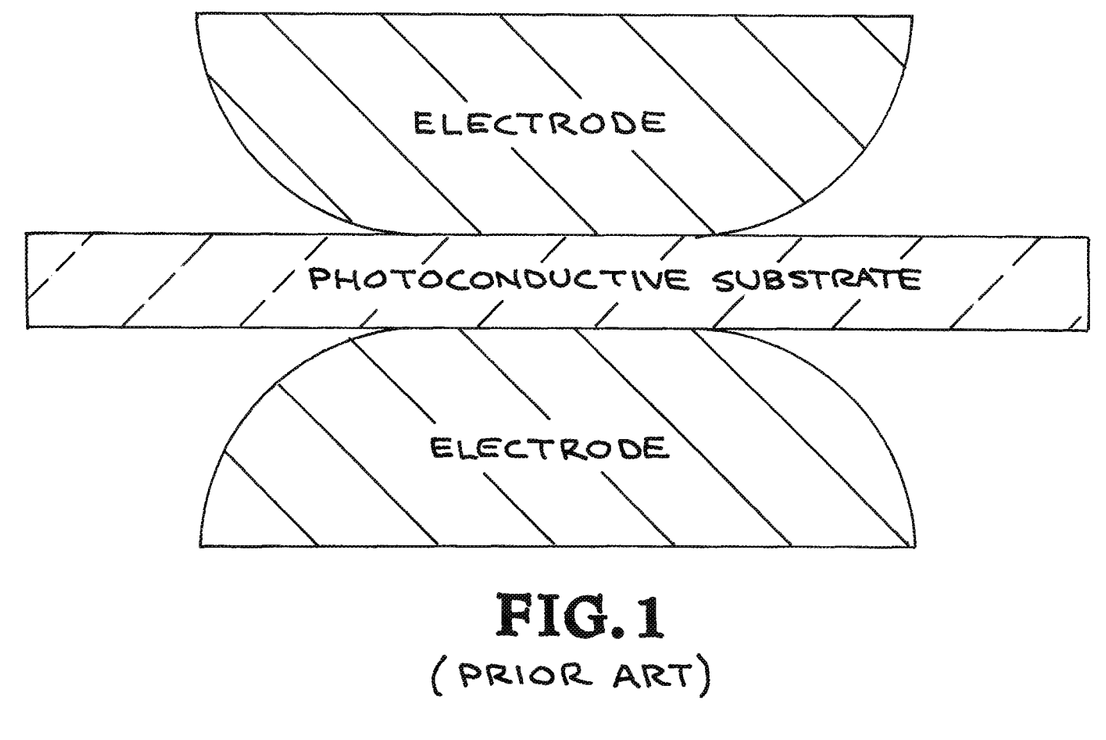
FIG. 1 is a schematic cross-sectional view of a photoconductive switch having electrodes with a curved edge profile.
Figure 2:
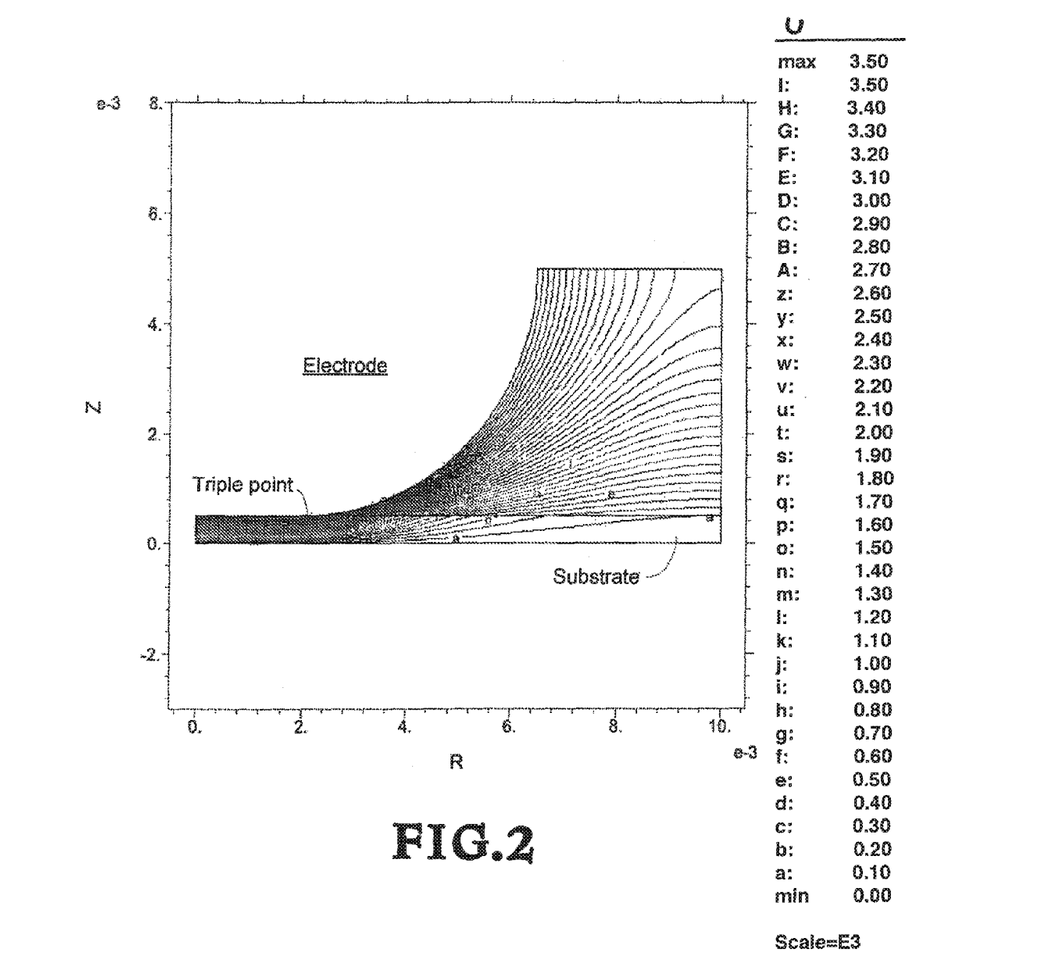
FIG. 2 is an equipotential plot of the switch of FIG. 1 in the "off" state.
Figure 3:
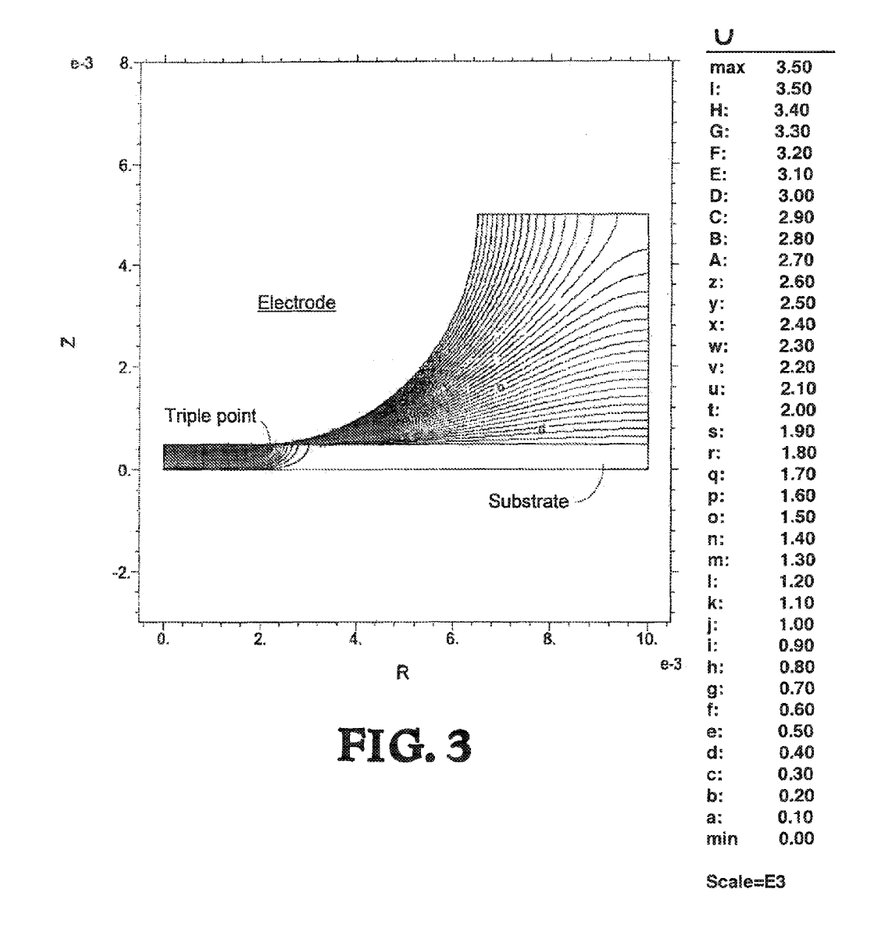
FIG. 3 is an equipotential plot of the switch of FIG. 1 in the "on" state.
Figure 4:
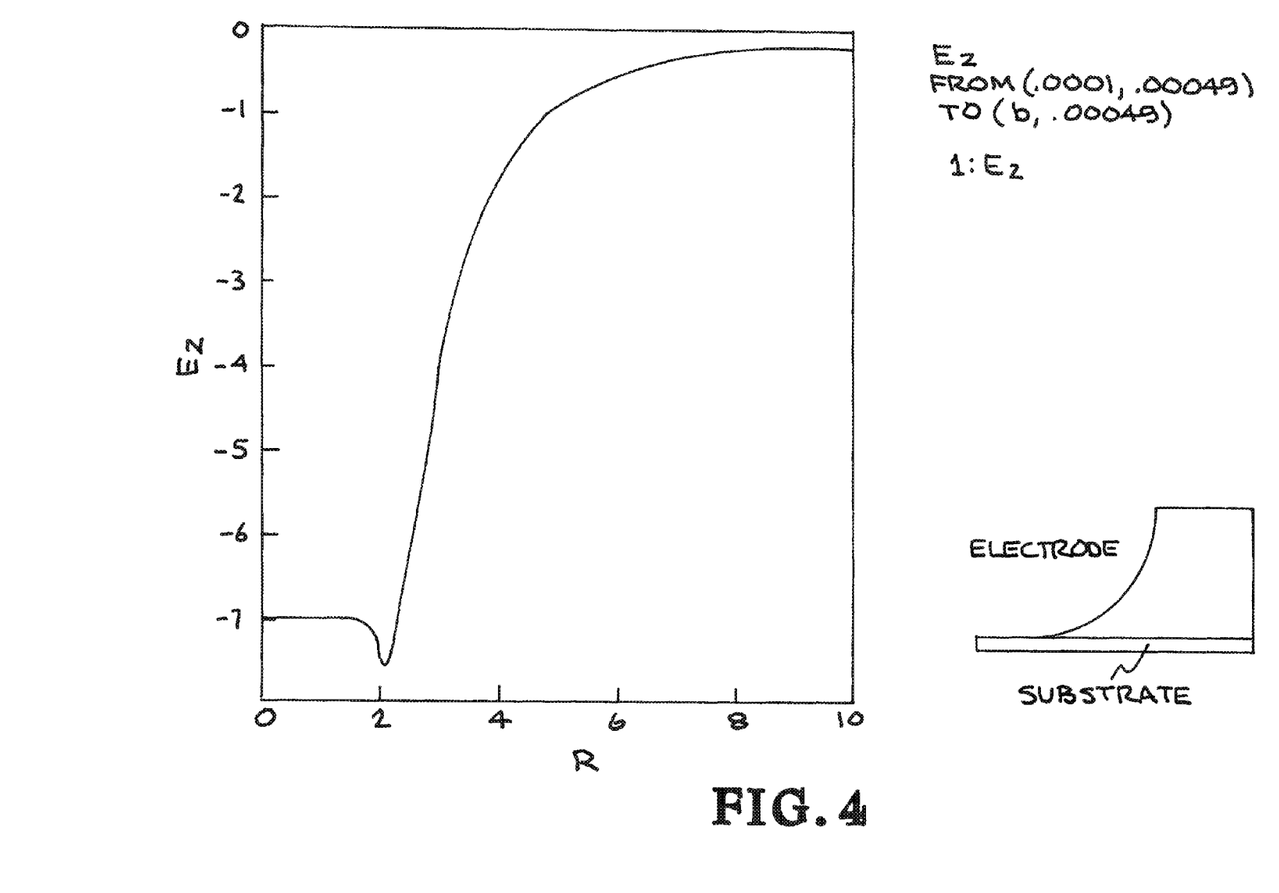
FIG. 4 is a vertical field plot of the switch of FIG. 1 in the "off" state.
Figure 5:
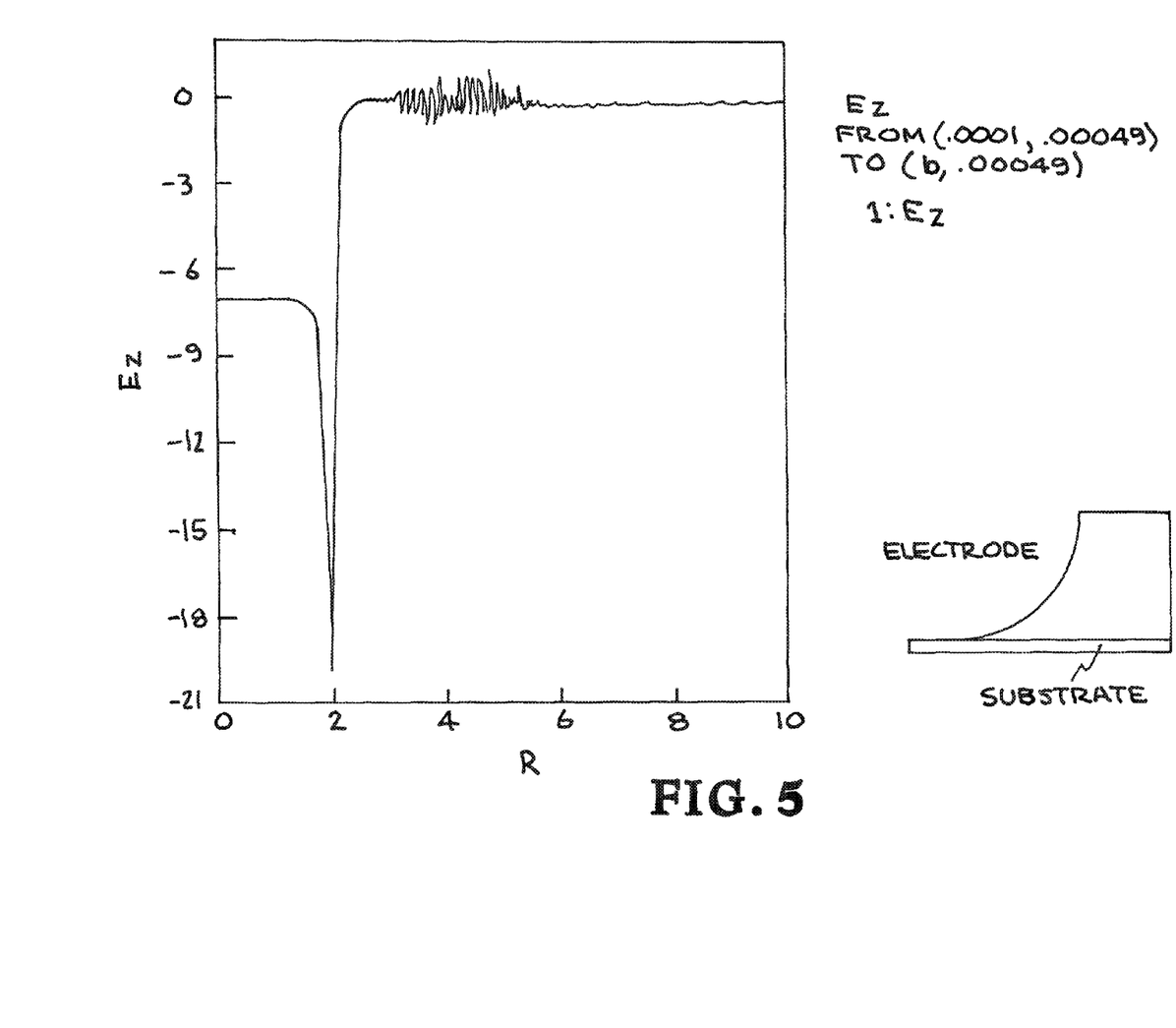
FIG. 5 is a vertical field plot of the switch of FIG. 1 in the "on" state.

Present design methods focus on shaping the electrodes and surrounding dielectric potting material to relieve these enhancements when the switch is in the off state (the condition when it is holding the maximum voltage). For example, FIG. 1 shows a switch design having electrodes with curved edge profiles intended to reduce edge enhancements. However, designing against the field enhancements when the switch is in the off state is often insufficient to prevent breakdown as the electric field distribution inside the substrate is profoundly modified once the substrate becomes conducting. For example, FIG. 2 shows the equipotential plot of the switch design of FIG. 1 in the "off" state, and illustrates how edge enhancement is reduced. And FIG. 4 shows the vertical field plot corresponding to the equipotential plot of FIG. 1. However, when the switch is in the "on" state, as shown in FIGS. 3 and 5, the vertical field has a field singularity at the electrode edge where, as shown particularly in FIG. 3, the equipotential lines must bend vertically around the electrode edge since the vertical field vanishes due to current not being able to flow into the insulator. Thus, while the resulting switches hold off substantial voltages when charged, a very large electric field enhancement can occur around the electrode edge when the substrate becomes conducting and breakdown at much lower charge voltages when laser light is applied to activate the switches, even when such an enhancement is totally absent when the switch is off.

There is therefore a need for an improved high voltage photoconductive switch that takes into account both operating states (switch off and on) to ensure that field enhancements under all conditions are minimized.

SUMMARY

In one example implementation, the present invention includes a photoconductive switch comprising: a wide bandgap material substrate; first and second electrodes in contact with said substrate; and a dielectric filler in contact with the electrodes and the adjacent substrate at a triple point, wherein the filler is doped with a conducting dopant to control the resistivity of the filler and make it at least partially conducting, for reducing electric field enhancements near the triple point.

Various other example implementations of the present invention may also further include, for example, wherein the filler is substantially uniformly doped with the dopant, or wherein the filler is doped with the dopant so that the resistivity thereof radially tapers toward an outer edge of the substrate. or wherein the filler is doped with the dopant so that in an "on" state when illuminated by a radiation source, resistivity through the doped dielectric filler is substantially the same as the substrate.

These and other implementations and various features and operations are described in greater detail in the drawings, the description and the claims.

The present invention is generally directed to a photoconductive switch that introduces some conductivity into the dielectric filler that is in contact with both the electrodes and the substrate at the triple point to minimize the field enhancement in both the off and on states. The present invention is intended to mitigate this issue by transversely illuminating the triple junction region of the photoconductive material (i.e. substrate) directly between opposing electrodes so that no portion outside the triple junction region is activated to conduct.

It is also appreciated that by optically exciting wide bandgap materials, the conductivity of bulk of the material is modulated. In such a device, the entirety of the crystal participates in the conduction process. For instance, a 100 micron thick crystal will have the capability approaching 40 kV and would replace ten equivalent junction devices. Thus, unlike junction devices, the wide bandgap material can be made arbitrarily thick to accommodate higher voltages in a single device. Furthermore, there is both a linear region and a saturation region as is with a typical transistor device. Thus, when the material is operated in the linear region, amplification of an applied modulation to the optical pulse will result in amplification of the applied signal. Such a device may consist of the modulation input to the radiation source (whether it be a laser, particle source, or x-ray source) and the wide bandgap semiconductor material. The terminals would then be the common electrode, the input to the modulation source, and the output terminal, Because this device is similar to a "transconductance varistor," or more commonly called a "transistor," such as device may be we characterized as an optical transconductance varistor, or "opticondistor."

DETAILED DESCRIPTION

Figure 6:
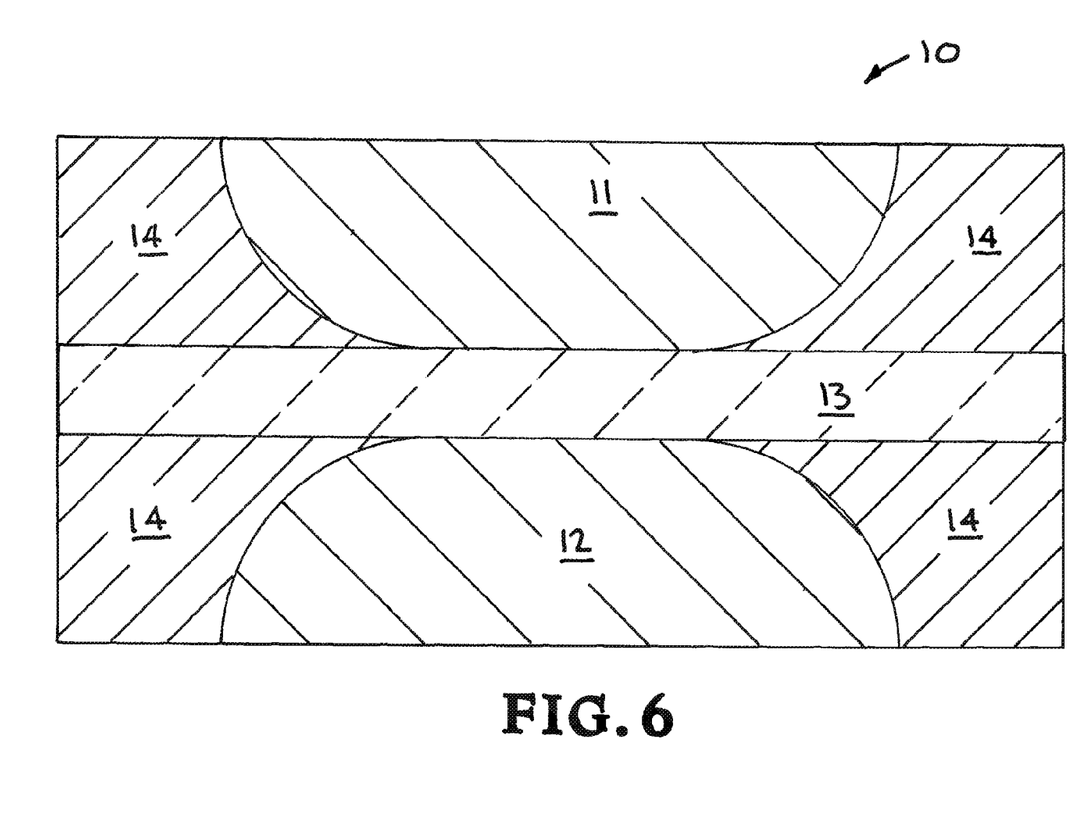
FIG. 6 shows an example embodiment of the improved photoconductive switch of the present invention with a dielectric filler material doped uniformly with a conductive dopant.
Figure 7:
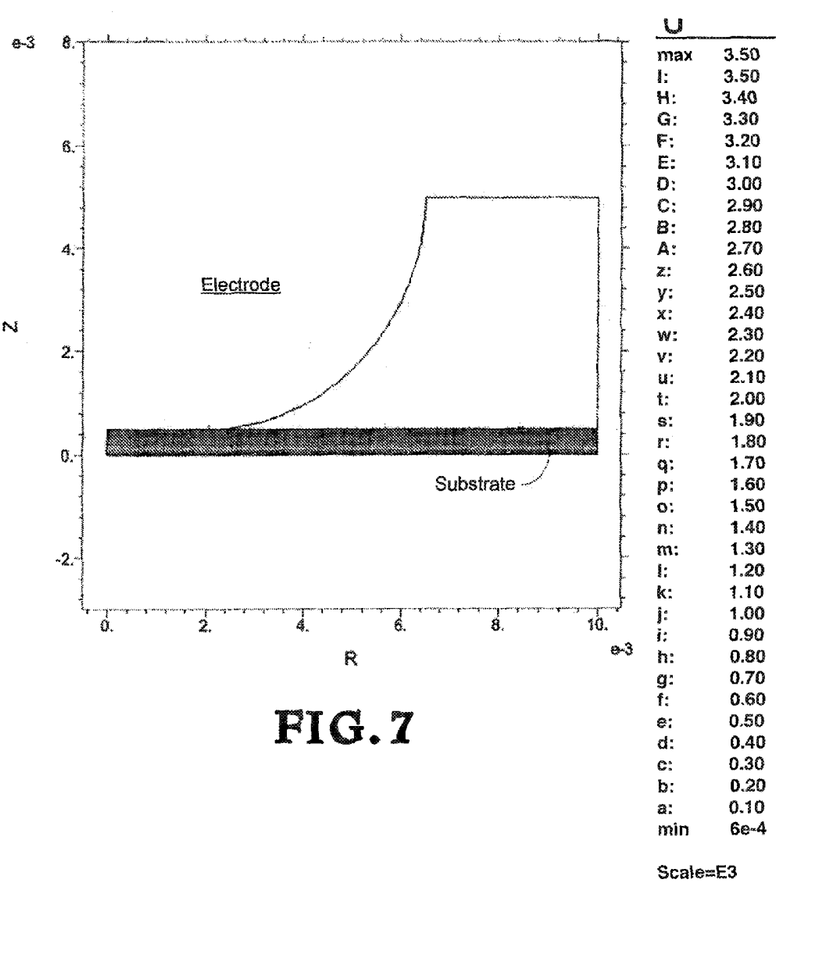
FIG. 7 is an equipotential plot of the switch of FIG. 6 in the "off" state.
Figure 8:
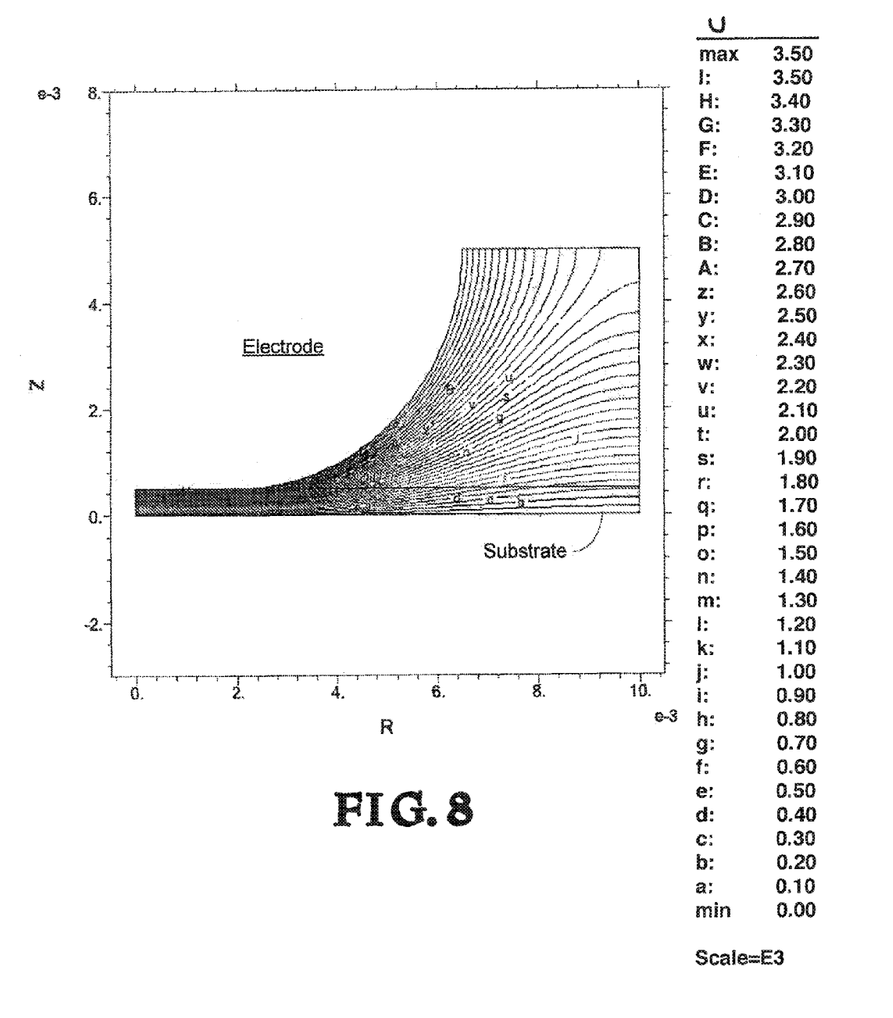
FIG. 8 is an equipotential plot of the switch of FIG. 6 in the "on" state.
Figure 9:
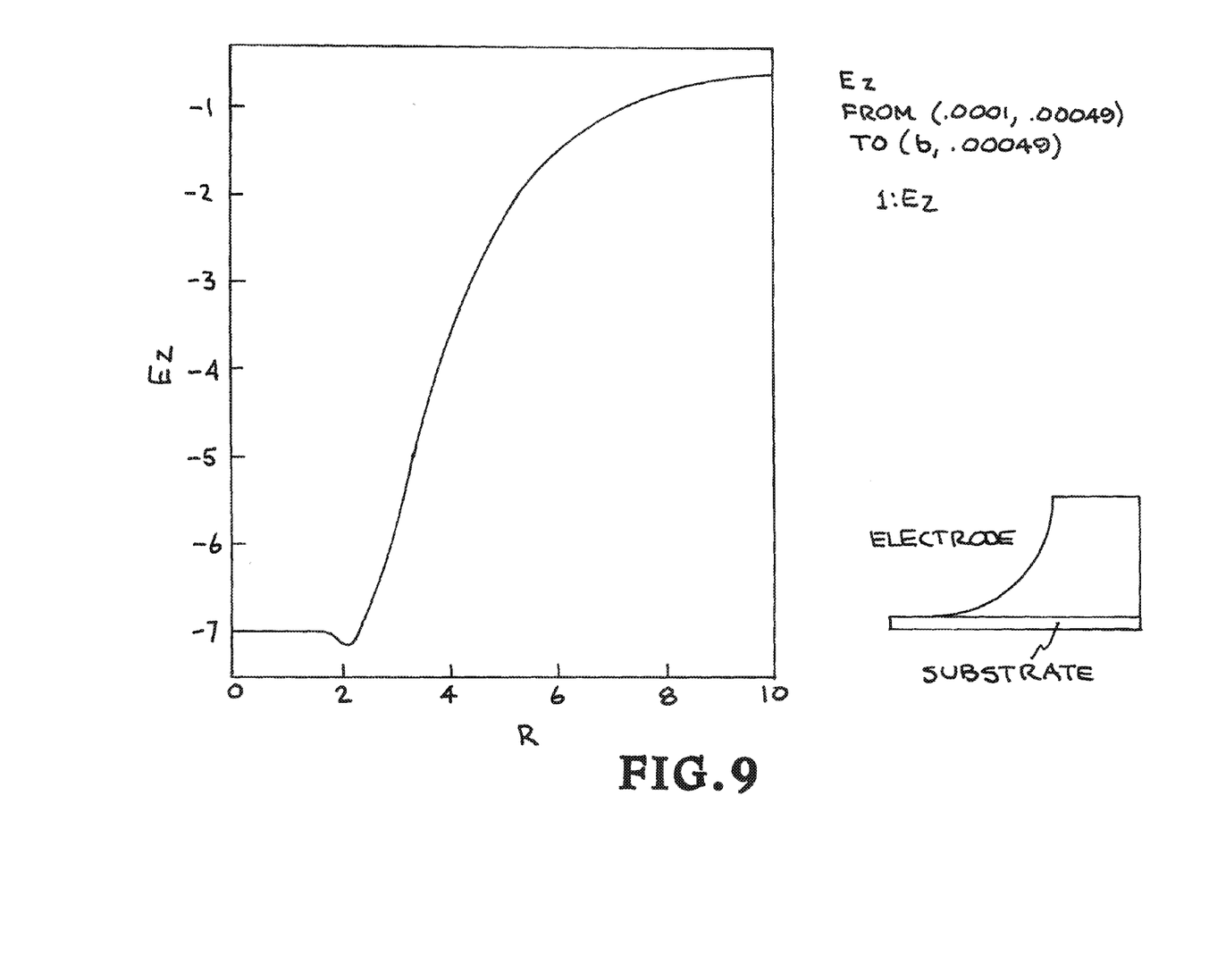
FIG. 9 is a vertical field plot of the switch of FIG. 6 in the "off" state.
Figure 10:
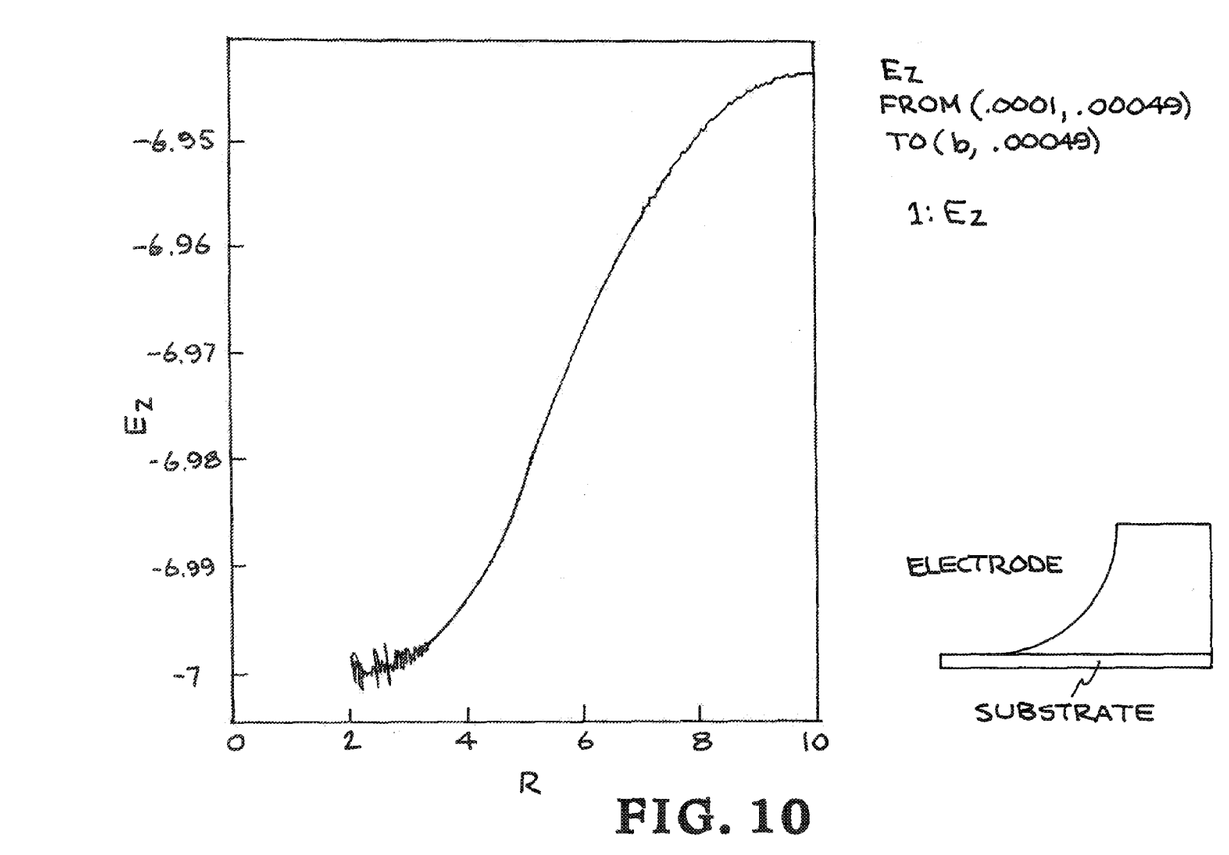
FIG. 10 is a vertical field plot of the switch of FIG. 6 in the "on" state.

Turning now to the drawings, FIG. 6 shows an example embodiment of the improved photoconductive switch or optical transconductance varistor ("opticondistor") of the present invention, generally indicated at 10. In particular, the switch configuration is shown having two opposing electrodes 11 and 12, with a wide bandgap material substrate 13 (e.g. photo-conductive, semi-insulating, or semi-conducting material) in contact therebetween. The photoconductive switch material can be in various shapes, such as for example, circular or round (e.g. a disk or flat cylinder) or square (e.g. a block), or non-parallel shapes, etc.

A dielectric filler material indicated at 14 is also shown in contact with the electrodes and the substrate at the triple point. The dielectric filler material is doped (e.g. uniformly) with a conducting material, such as for example carbon particles/nanoparticles, etc., to control the resistivity or conductivity of the filler material and render it least partially conducting. And the dielectric filler may be various types, including for example epoxy, etc. In the alternative, an undoped but at least partially conducting dielectric material may be used as the filler. While retaining the benefits of the current electrode and dielectric package design by preserving that basic structure, the dielectric filler material introduces some conductivity to minimize, reduce, or substantially eliminate any field enhancements over the electrode edge (at the triple junction point) in both operating states (switch off and on), to ensure that field enhancements under all conditions are minimized, as shown in the equipotential and vertical field plots shown in FIGS. 7-10. And in one example embodiment, the filler is doped with the dopant so that in an "on" state when illuminated by a radiation source, resistivity through the doped dielectric filler is substantially the same as the substrate. This may be achieved, for example, by controlling the concentration of the dopant in the filler. For example, in certain experiments performed, the value of the conductivity for the substrate in the "on" state was determined to be about 10 Siemens/meter. And the conductivity of the dielectric filler material was controlled to be about the same value. There is a characteristic time for accumulated charges in a conducting medium to relax that is roughly equal to epsilon/sigma where epsilon is the dielectric permittivity of the medium in Farads/meter and sigma is the conductivity is Siemens/meter. It would be advantageous for the charge relaxation time in the dielectric filler to be about the same value as in the substrate (when it's "on") or less, in order to minimize any charge accumulations at the interface between the substrate and dielectric so that the field singularity does not occur.

Figure 11:
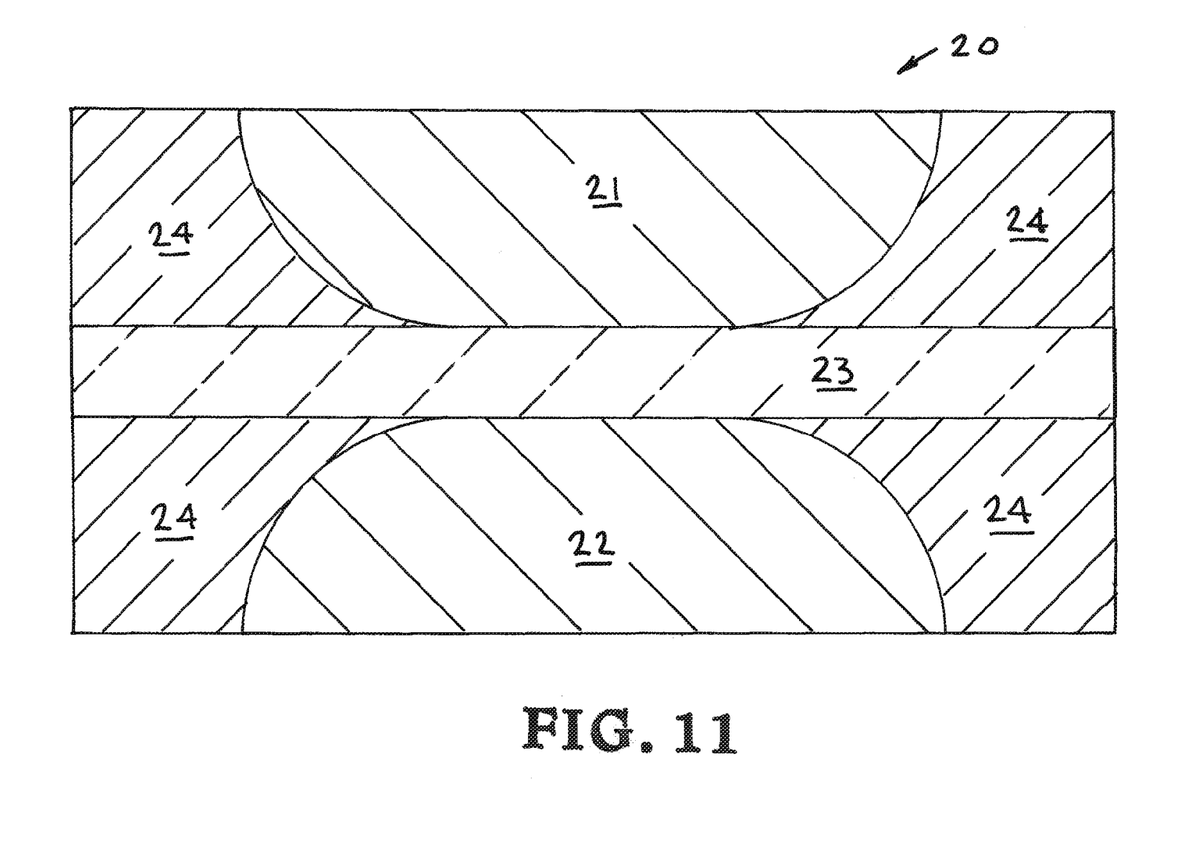
FIG. 11 shows another example embodiment of the improved photoconductive switch of the present invention with a dielectric filler material that is doped in radially graded manner so that conductivity decreases in a radially outward direction.
Figure 12:
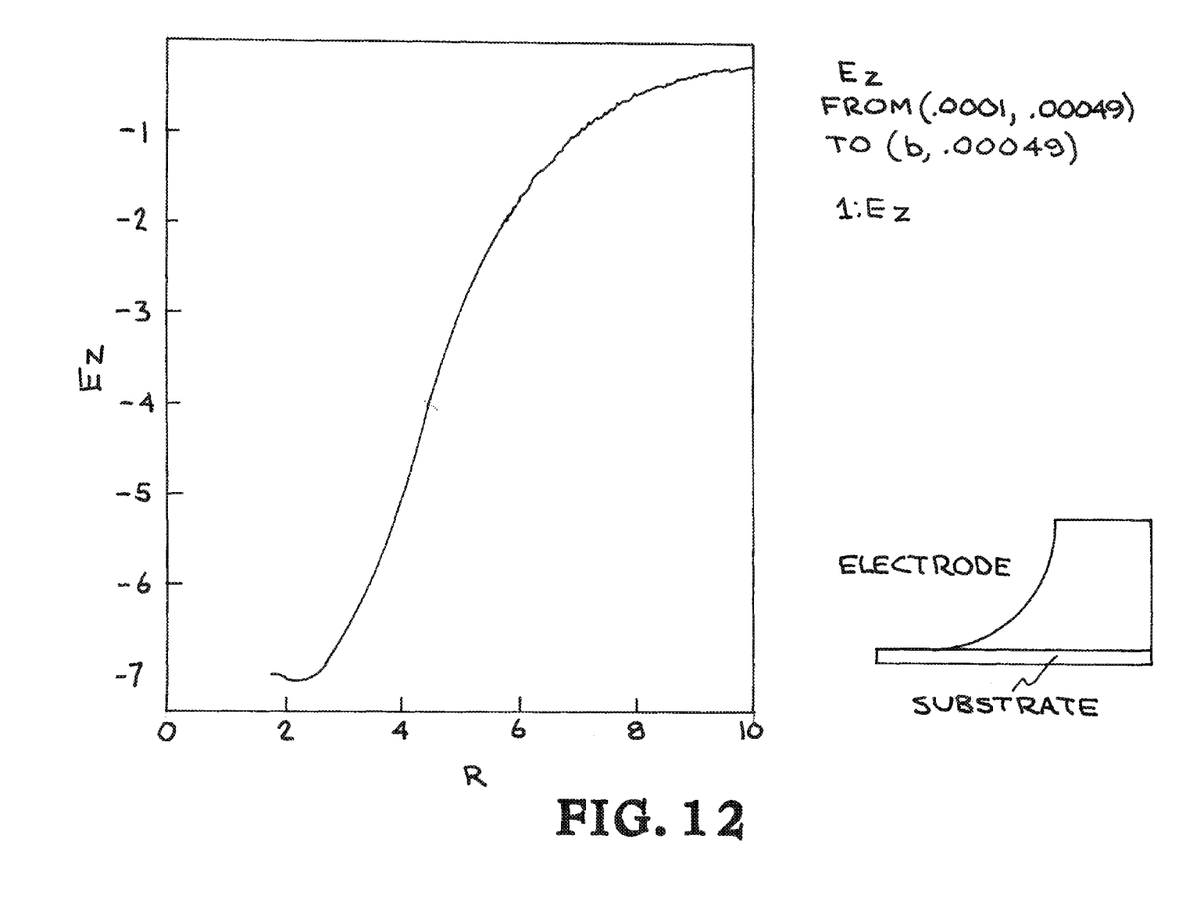
FIG. 12 is a vertical field plot of the switch of FIG. 11 in the "off" state.

FIG. 11 shows another embodiment of the improved photoconductive switch of the present invention, generally indicated at 20, and having a similar construction as that shown in FIG. 6 with opposing electrodes 21 and 22, and a wide bandgap material substrate 23, which again may be either a photo-conductive, semi-insulating, or semi-conducting material in contact therebetween. Here however, the dielectric filler material 24 is doped with a conductive dopant in a radially graded manner so that the conductivity of the dielectric filler is reduced with radius, so that the resulting electric field at the edge of the substrate can be made to be very small. FIG. 12 shows a vertical field plot of the switch of FIG. 11 in the "off" state, showing how the field decreases to nearly zero at the substrate edge.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

We claim:

1. A photoconductive switch, comprising:
   a wide bandgap material substrate;
   first and second electrodes in contact with said substrate; and
   a dielectric filler in contact with the electrodes and the adjacent substrate at a triple point, wherein the filler is doped with a conducting dopant to control the resistivity of the filler and make it at least partially conducting, for reducing electric field enhancements near the triple point,
   wherein the filler is doped with the dopant so that the resistivity thereof radially tapers toward an outer edge of the substrate.

2. A photoconductive switch comprising:
   a wide bandgap material substrate;
   first and second electrodes in contact with said substrate; and
   a dielectric filler in contact with the electrodes and the adjacent substrate at a triple point, wherein the filler is doped with a conducting dopant to control the resistivity of the filler and make it at least partially conducting, for reducing electric field enhancements near the triple point,
   wherein the filler is doped with the dopant so that in an "on" state when illuminated by a radiation source, resistivity through the doped dielectric filler is substantially the same as the substrate.

* * * * *